United States Patent
Ahn

(10) Patent No.: US 8,986,865 B2
(45) Date of Patent: Mar. 24, 2015

(54) BATTERY UNIT AND BATTERY MODULE HAVING COOLING STRUCTURE

(75) Inventor: Laurence Sang-Kyu Ahn, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 373 days.

(21) Appl. No.: 13/069,873

(22) Filed: Mar. 23, 2011

(65) Prior Publication Data
US 2012/0088132 A1    Apr. 12, 2012

(30) Foreign Application Priority Data
Oct. 12, 2010 (KR) .................. 10-2010-0099294

(51) Int. Cl.
| H01M 10/6551 | (2014.01) |
| H01M 2/02 | (2006.01) |
| H01M 10/613 | (2014.01) |
| H01M 10/647 | (2014.01) |

(52) U.S. Cl.
CPC ........ H01M 10/5046 (2013.01); H01M 2/0212 (2013.01); H01M 10/5004 (2013.01); H01M 10/5032 (2013.01)
USPC .......................................................... 429/83

(58) Field of Classification Search
None
See application file for complete search history.

(56) References Cited

U.S. PATENT DOCUMENTS

| 7,353,900 | B2 * | 4/2008 | Abe et al. ..................... 180/68.5 |
| 2002/0028375 | A1 * | 3/2002 | Morishita et al. ............. 429/120 |
| 2006/0060402 | A1 * | 3/2006 | Abe et al. ..................... 180/68.5 |
| 2006/0063067 | A1 | 3/2006 | Kim |
| 2006/0115720 | A1 * | 6/2006 | Kim .............................. 429/156 |
| 2006/0246350 | A1 | 11/2006 | Takayama et al. |
| 2007/0126396 | A1 | 6/2007 | Yang |
| 2007/0141457 | A1 | 6/2007 | Amagai |
| 2008/0299449 | A1 * | 12/2008 | Yun et al. ..................... 429/120 |
| 2010/0136420 | A1 * | 6/2010 | Shin et al. .................... 429/178 |
| 2010/0285347 | A1 | 11/2010 | Saito et al. |

FOREIGN PATENT DOCUMENTS

| JP | 2008159439 | 7/2008 |
| JP | 2008277085 | 11/2008 |
| JP | 2009224226 | 10/2009 |
| JP | 2010049842 | 3/2010 |
| KR | 10-0649561 | 11/2006 |
| KR | 10-2007-0057344 | 6/2007 |
| KR | 10-2009-0091942 | 8/2009 |
| KR | 10-2010-0047210 | 5/2010 |

* cited by examiner

Primary Examiner — Patrick Ryan
Assistant Examiner — Lucas J O'Donnell
(74) Attorney, Agent, or Firm — Robert E. Bushnell, Esq.

(57) ABSTRACT

A battery unit and a battery module including a stack of a plurality of the battery units. The battery unit includes: a battery cell including electrode terminals; and a case for housing the battery cell, wherein the case includes: a spacer that is disposed on facing portions of an edge of the case and protrudes in a thickness direction of the case, an inlet guide portion for guiding air for cooling the battery cell, and an outlet guide portion for guiding air to be discharged toward the electrode terminals.

14 Claims, 9 Drawing Sheets

BATTERY UNIT AND BATTERY MODULE HAVING COOLING STRUCTURE

CLAIM OF PRIORITY

This application makes reference to, incorporates the same herein, and claims all benefits accruing under 35 U.S.C. §119 from an application earlier filed in the Korean Intellectual Property Office on Oct. 12, 2010 and there duly assigned Ser. No. 10-2010-0099294.

BACKGROUND OF THE INVENTION

1. Field of the Invention

The general inventive concept of the present invention relates to battery units and battery modules.

2. Description of the Related Art

Unlike primary batteries, which are not chargeable, secondary batteries are chargeable and thus referred to as rechargeable batteries. Secondary batteries are used in a wide range of applications including high-end small electronic devices, such as mobile phones, personal digital applications (PDAs), or notebook computers, and energy storage systems.

Since secondary batteries are repeatedly charged and discharged for long-term use, useable periods and battery stability are important factors to be considered. While secondary batteries operate, heat is generated, and due to the heat, the temperature of secondary batteries increases. Thus, unless the heat is efficiently removed by cooling, the lifetime of secondary batteries is decreased and secondary batteries may malfunction. Accordingly, cooling is a critical factor in manufacturing batteries.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include battery units with high cooling efficiency that are easily assembled and battery modules.

Additional aspects will be set forth in part in the description which follows and, in part, will be apparent from the description, or may be learned by practice of the presented embodiments.

According to one or more embodiments of the present invention, a battery unit may include: a battery cell including electrode terminals; and a case for housing the battery cell, wherein the case may include: a spacer that is disposed on facing portions of an edge of the case and protrudes in a thickness direction of the case, an inlet guide portion for guiding air for cooling the battery cell, and an outlet guide portion for guiding air to be discharged toward the electrode terminals.

According to an aspect of the present invention, a width of the outlet guide portion may be narrower than a width of the inlet guide portion.

According to an aspect of the present invention, the inlet guide portion includes a plurality of guide pins extending in a direction in which air flows.

The inlet guide portion may include a surface inclined with respect to a direction in which air enters.

The outlet guide portion may include a separation wall for dividing discharged air into at least two layers.

The separation wall may be inclined toward the electrode terminals.

According to another embodiment of the present invention, the outlet guide portion may include: a first-layer outlet guide portion for guiding air to be discharged toward the electrode terminals; and a second-layer outlet guide portion that is disposed above the first-layer outlet guide portion and guides air to be discharged, wherein at least one of the first-layer outlet guide portion and the second-layer outlet guide portion includes a plurality of guide pins extending in a direction in which air is discharged.

The case may expose at least one surface of upper and lower surfaces of the battery cell.

A thickness of the case may be greater than a thickness of the battery cell.

The case may include terminal housing portions for housing the electrode terminals.

Each of the terminal housing portions includes protrusions on side ends of each terminal housing portion.

The inlet guide portion may be opposite to the outlet guide portion.

According to one or more embodiments of the present invention, a battery module may include: a plurality of battery units stacked on each other in a thickness direction; and a cooling channel formed between neighboring battery units of the battery units to provide a space in which air for cooling the battery units flows, wherein each of the battery units includes: a battery cell including electrode terminals, and a case for housing the battery cell, wherein the case may include: a spacer that is disposed on facing portions of an edge of the case and protrudes in a thickness direction of the battery unit, an inlet guide portion for guiding air into the cooling channel, and an outlet guide portion for guiding air to be discharged toward the electrode terminals.

The battery units may be stacked using the spacer.

A width of the outlet guide portion may be narrower than a width of he inlet guide portion.

At least one of the inlet guide portion and the outlet guide portion may include a plurality of guide pins extending in a direction in which air flows.

The inlet guide portion may include a surface inclined with respect to a direction in which air enters.

The outlet guide portion may include a separation wall that is for dividing discharged air into two layers and that is aligned in a direction perpendicular to the thickness direction.

The separation wall may be inclined toward the electrode terminals.

The outlet guide portion may include: a first-layer outlet guide portion for guiding air to be discharged toward the electrode terminals; and a second-layer outlet guide portion that may be disposed above the first-layer outlet guide portion and guides air to be discharged to the outside the battery module, wherein at least one of the first-layer outlet guide portion and the second-layer outlet guide portion includes a plurality of guide pins extending in a direction in which air is discharged.

The case may expose at least one surface of upper and lower surfaces of the battery cell to the cooling channel.

The inlet guide portion may be opposite to the outlet guide portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
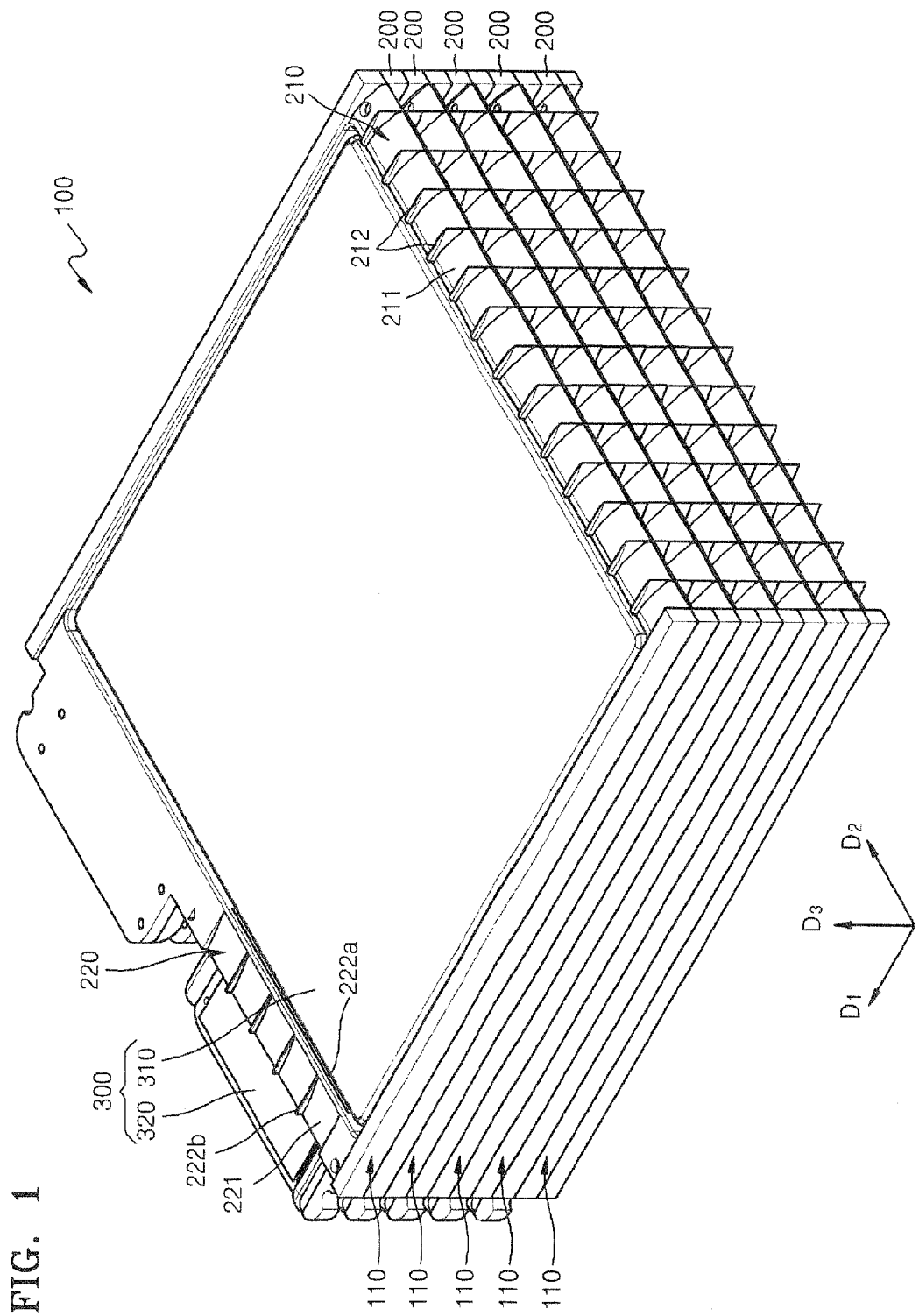
FIG. 1 is a perspective view of a battery module according to an embodiment of the present invention showing an inlet guide portion.

The merits and characteristics of the present invention, and methods for accomplishing them may be obvious in view of embodiments described in detail with reference to the attached drawings. However, the present invention is not limited to the following embodiments, and may have different forms and should not be construed as being limited to the descriptions set forth herein. While this invention has been particularly shown and described with reference to embodiments thereof, it will be understood by those skilled in the art that various changes in form and details may be made therein without departing from the spirit and scope of the invention as defined by the appended claims. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated elements, steps, operations, and/or devices, but do not preclude the presence or addition of one or more other elements, steps, operations, and/or devices. It will also be understood that, although the terms first, second, etc. may be used herein to describe various elements, these elements should not be limited by these terms. These terms are only used to distinguish one element from another.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

The terms 'D1,' 'D2,' and 'D3' used herein refer to a lengthwise direction, a widthwise direction, and a thickness direction of a battery unit and a battery module, respectively. In the present specification, embodiments will be described assuming that air flows in a D1 direction.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 2:
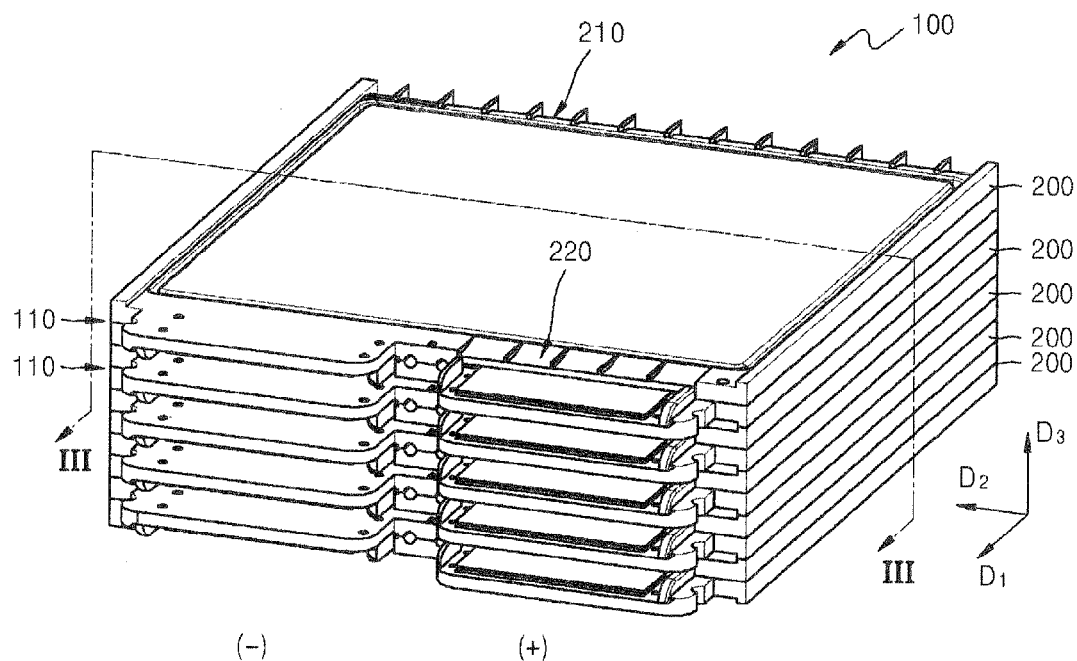
FIG. 2 is a perspective view of the battery module of FIG. 1 showing an outlet guide portion.
Figure 3:
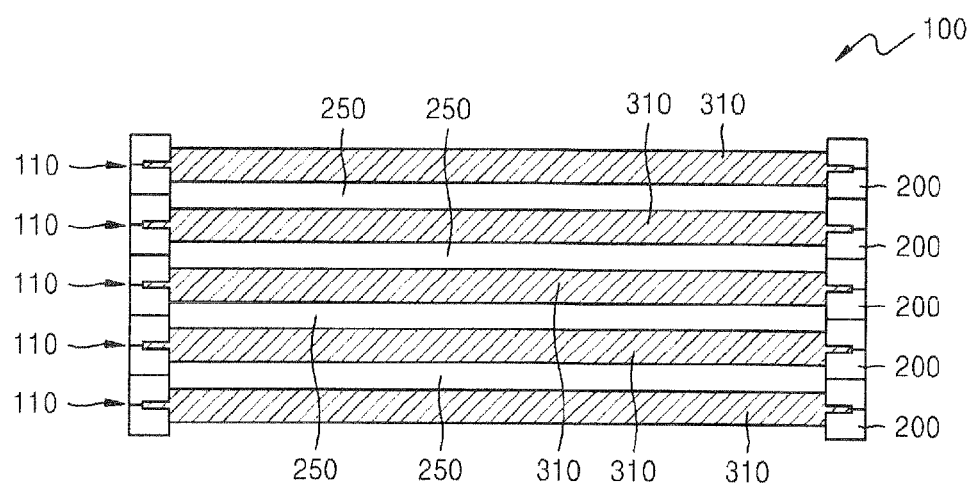
FIG. 3 is a cross-sectional view taken along a line III-III of FIG. 2.

FIG. 1 is a perspective view of a battery module 100 according to an embodiment of the present invention showing an inlet guide portion 210, FIG. 2 is a perspective view of the battery module 100 of FIG. 1 showing an outlet guide portion 220, and FIG. 3 is a cross-sectional view taken along a line III-III of FIG. 2.

Referring to FIGS. 1 through 3, the battery module 100 includes a stack of battery units 110, in which the battery units 110 are stacked in the D3 direction such that electrode terminals 320 are disposed in the same direction. A space between neighboring battery units 110 may form a cooling channel 250 through which air may flow. The air cools the battery units 110 while flowing through the cooling channel 250.

The battery module 100 may include the inlet guide portion 210 and the outlet guide portion 220, which guide an air flow for cooling the battery module 100. The inlet guide portion 210 may be connected to a side of the cooling channel 250 such that air may flow therethrough, and the outlet guide portion 220 is connected to another side of the cooling channel 250 such that air may flow therethrough. The inlet guide portion 210 guides outside air into the cooling channel 250, and the outlet guide portion 220 guides air that has flown through the cooling channel 250 toward the electrode terminal 320.

A cooling fan (not shown) may be disposed near the inlet guide portion 210. The cooling fan may provide a driving force that directs air into the battery module 100.

The inlet guide portion 210 may include an inclination surface 211 that is inclined with respect to a direction in which air flows. Also, since a space between neighboring battery units 110 corresponds to the cooling channel 250, on a side of the cooling channel 250 on which the inlet guide portion 210 is disposed, a lower surface of an inlet guide portion of one battery unit faces an upper surface of an inlet guide portion of another battery unit. Thus, the lower and upper surfaces of the inlet guide portions 210 of neighboring battery units 110 may form a funnel-shaped space having an increasing cross-section toward the outside. Due to the funnel-shaped space, a resistance against air entering the battery module 100 is reduced and more air is able to enter the battery module 100.

The inlet guide portion 210 may be divided into a plurality of regions by guide pins 212. The guide pins 212 extend in a direction in which air flows, and are spaced apart from each other by intervals on the inclination surface 211. Then entering air is divided into a plurality of parts by the guide pins 212 and the air flowing in the battery module 100 may flow linearly.

The inlet guide portion 210 may be disposed on a side of the battery module 100, facing the outlet guide portion 220. If the inlet guide portion 210 is disposed on a side of the battery module 100 and the outlet guide portion 220 is disposed on a side opposite to the inlet guide portion 210, air in the battery module 100 flows along a linear pathway. Thus, air entering through the inlet guide portion 210 flows the same distance and may have a constant speed regardless of pathway. If air flows along a curved pathway, the flow rate of the air may differ according to location in the curved pathway or the air may be locally stagnant However, according to the present embodiment, air linearly flows. Thus, air may flow in the battery module 100 uniformly and without stagnating.

The outlet guide portion 220 and the electrode terminals 320 are disposed on the same side of the battery module 100. The outlet guide portion 220 guides air that has flown through the cooling channel 250 toward the electrode terminals 320. air flowing along the outlet guide portion 220 cools the electrode terminals 320. To do this, the outlet guide portion 220 may be disposed directly next to the electrode terminals 320 and at a location right before air that has flown through the cooling channel 250 is to pass over the electrode terminals 320.

A cross-sectional area of the outlet guide portion 220 may be smaller than a cross-sectional area of the inlet guide portion 210. When air flows in the battery module 100, the air absorbs heat from a battery cell 300 and thus the temperature of the air is increased. Since the speed of the air is increased when the air passes through a relatively narrow cross-section of the outlet guide portion 220, cooling efficiency for the electrode terminals 320 may be increased.

Air that passes through one cooling channel cools an anode terminal of one of two neighboring battery units 100 and a cathode terminal of the other one. This is because anode and cathode terminals of one battery unit are exposed in opposite directions. The structure of the battery unit 110 will be described later in detail with reference to FIGS. 4 through 6.

In addition, air cools main bodies 310 of adjacently stacked battery cells 300 while flowing through the cooling channel 250. As described above, since the cooling channel 250 is formed between neighboring battery units 110, air passing through the cooling channel 250 directly contacts a lower surface of an upper battery unit and an upper surface of a lower battery unit. The air absorbs heat generated by the battery cell 300 of the battery unit 110 by directly contacting the battery units 110.

Hereinafter, the battery unit 110 of the battery module 100 according to the present embodiment will be described in detail.

Figure 4:
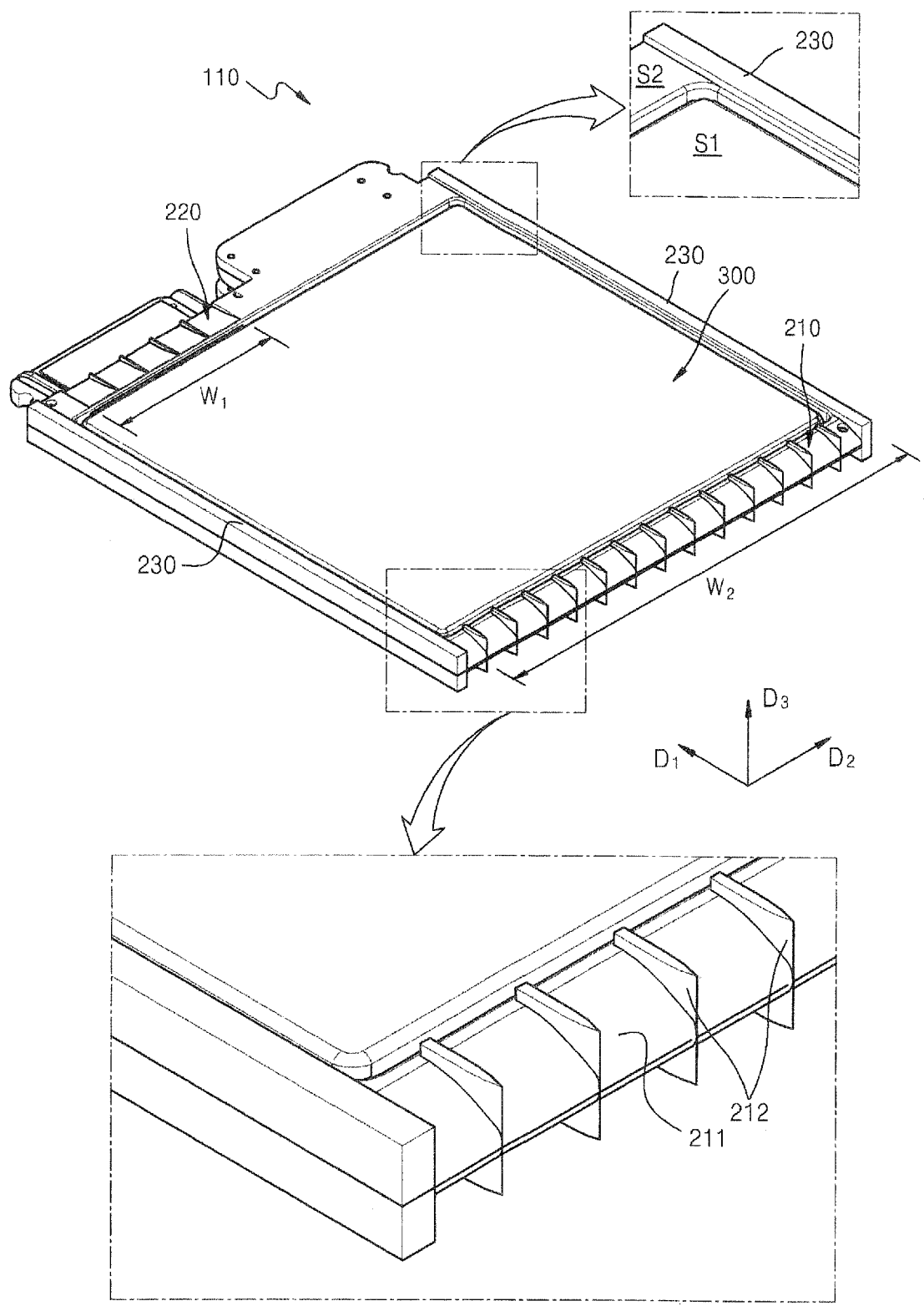
FIG. 4 is a schematic view of a battery unit that constitutes the battery module of FIG. 1.
Figure 5:
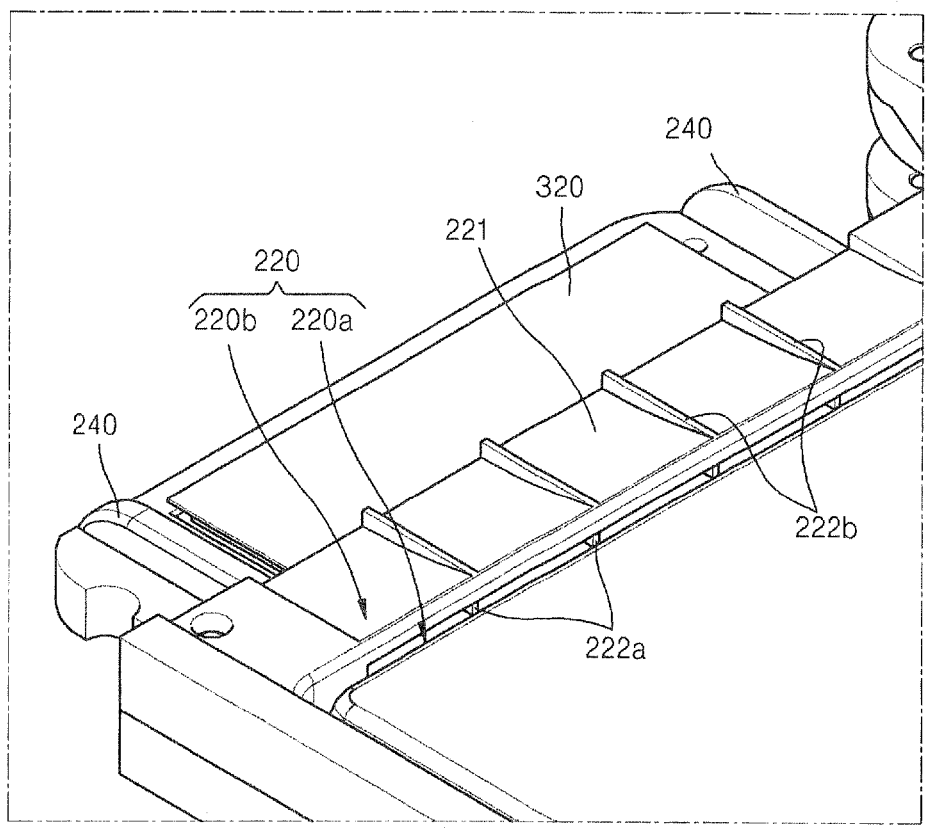
FIG. 5 is a perspective enlarged view of an outlet guide portion of a battery unit.
Figure 6:
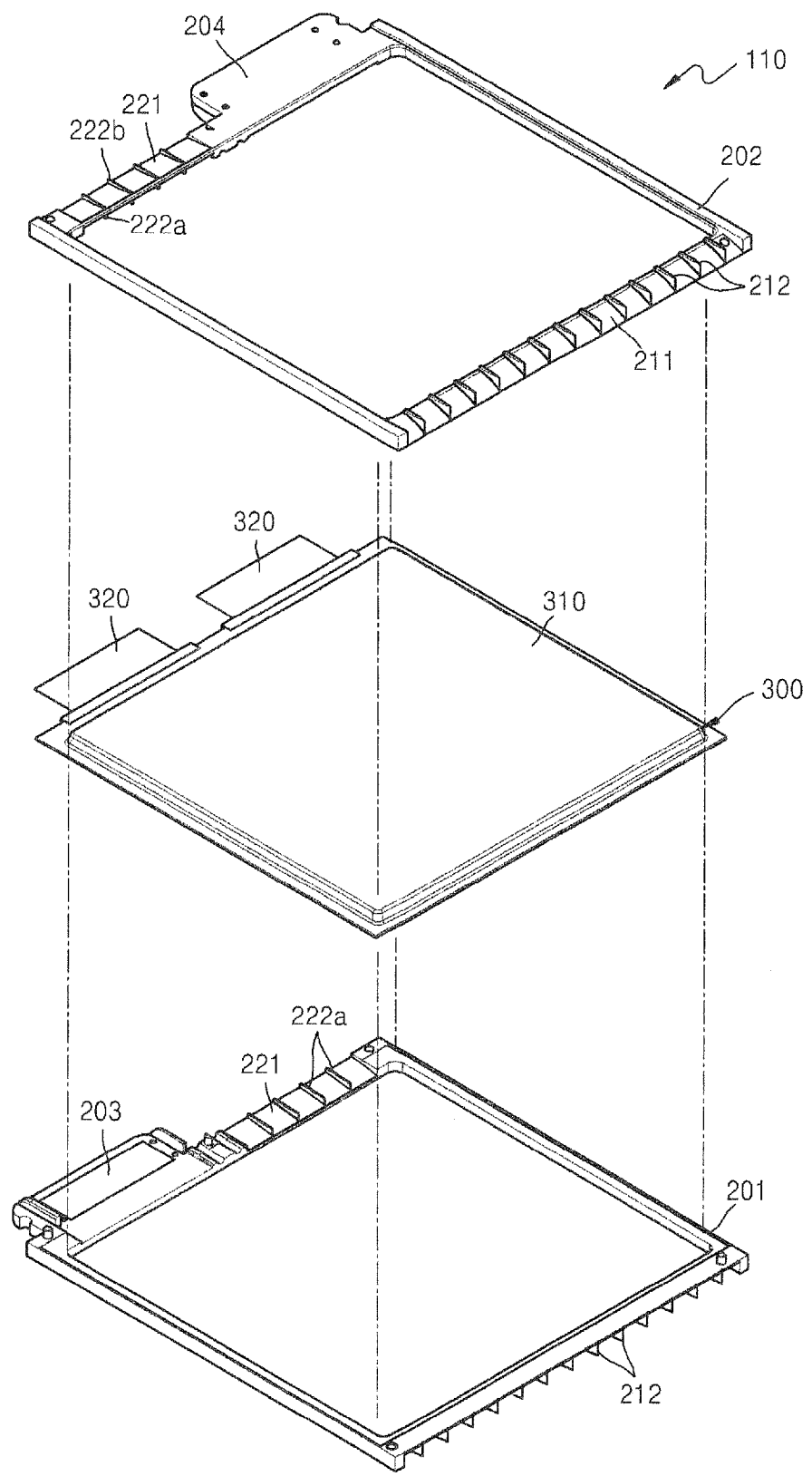
FIG. 6 is an exploded perspective view of the battery unit of FIG. 4.

FIG. 4 is a schematic view of the battery unit 110 according to an embodiment of the present invention, FIG. 5 is a perspective enlarged view of the outlet guide portion 220 of the battery unit 110 of FIG. 4, and FIG. 6 is an exploded perspective view of the battery unit 110 of FIG. 4.

Referring to FIGS. 4 and 6, the battery unit 110 may include the battery cell 300 and a case 200 for housing the battery cell 300.

The battery cell 300 may be square-shaped, and may include the main body 310 for housing an electrode assembly and the electrode terminals 320 protruding in one direction. The electrode terminals 320 have positive and negative polarities, respectively. The cathode terminal 320 and the anode terminal 320 protrude in one direction and may each have a given width. The battery cell 300 may be a rechargeable battery, such as a nickel-cadmium battery, a nickel hydrogen battery, a lithium-ion battery, or a lithium polymer battery.

The case 200 may house the battery cell 300. The case 200 may include a first case 201 and a second case 202 that are respectively disposed above and under the battery cell 300. The first case 201 may be combined with the second case 202 by bosses and holes while the battery cell 300 is interposed between the first and second cases 201 and 202. Alternatively, the combination of the first case 201 and the second case 202 may be performed by cohesion or thermal fusion.

The case 200 may house, in addition to the main body 310 of the battery cell 300, the electrode terminals 320. To do this, the case 200 may include a first terminal housing portion 203 for housing the cathode terminal 320 and a second terminal housing portion 204 for housing the anode terminal 320.

The first case 201 surrounds the main body 310 of battery cell 300 and houses the cathode terminal 320 by using the first terminal housing portion 203. A surface of the cathode terminal 320 faces the first terminal housing portion 203 and another surface of the cathode terminal 320 is exposed to the outside. The second case 202 surrounds the main body 310 of battery cell 300 and houses the anode terminal 320 by using the second terminal housing portion 204. A surface of the anode terminal 320 faces the second terminal housing portion 204, and another surface of the anode terminal 320 is exposed in an opposite direction to the exposure direction of the surface of the cathode terminal 320.

The case 200 may be frame-shaped, surrounding an edge of the battery cell 300. Since the case 200 surrounds only the edge of the battery cell 300, upper and lower surfaces of the battery cell 300, more specifically main body 310 of the battery cell 300 are exposed to the outside. Since air flowing through the cooling channel 250 directly contacts the main body 310 as described above with reference to FIG. 3, the cooling efficiency for the battery cell 300 may be increased.

A spacer 230 may be disposed on facing portions of an edge of the case 200. For example, the spacer 230 and the case 200 may be formed as one body by extraction molding. Alternatively, the spacer 230 and the case 200 may be formed separately and then combined with each other. Neighboring battery units 110 may be stacked on each other to form the battery module 100 by using the spacer 230.

When the battery units 110 are stacked, a space, that is, the cooling channel 250, is fanned between neighboring battery units 110 by the spacer 230. For example, if the spacer 230 has a large thickness, the cooling channel 250 is wide, and if the spacer 230 has a small thickness, the cooling channel 250 is narrow.

Meanwhile, a thickness $t_1$ of the case 200 may be greater than that $t_2$ of the battery cell 300. Since the case 200 is thicker than the battery cell 300, the inside of the battery unit 110 has a stepwise shape (see FIG. 4). That is, the upper surface S1 of the battery cell 300 lies lower than an upper surface S2 of the case 200. Due to the stepwise shape, the cooling channel 250 is increased in size, thereby allowing more air to flow into the cooling channel 250.

The case 200 may include the inlet guide portion 210 through which air for cooling the battery cell 300 enters and the outlet guide portion 220 through which the air that has entered flows out. The outlet guide portion 220 may be disposed on a side of the battery unit 110 in which the electrode terminal 320 is located. and the inlet guide portion 210 disposed on another side of the battery unit 110 is opposite to the outlet guide portion 220.

Since the inlet guide portion 210 is formed on a side of the battery unit 110, a width W2 of the inlet guide portion 210 is substantially identical to a width of the battery unit 110. This structure enables air to flow while the air directly contacts the battery cell 300.

The inlet guide portion 210 includes the inclination surface 211. The inclination surface 211 is inclined with respect to the direction in which air flows. In this regard, the inclination surface 211 is inclined so that the space formed by lower and upper portions of outlet guide portions of neighboring battery units has an increasing cross-section toward the outside of the case 200, thereby allowing air to enter the case 200 along the inclination surface 211.

The inlet guide portion 210 may include the guide pins 212. The guide pins 212 are spaced apart from each other at given intervals on the inclination surface 211. Since the guide pin 212 allows air to flow in a constant direction, a turbulent air flow may not occur at the inlet guide portion 210.

The first case 201 and the second case 202 may be formed by using the same mold. The inclination surface 211 of the inlet guide portion 210 is formed on the first case 201 and the second case 202. And, since a space between neighboring battery units 110 corresponds to the cooling channel 250, on a side of the cooling channel 250 on which the inlet guide portion 210 may be disposed, a lower surface of an inlet guide portion of one battery unit faces an upper surface of an inlet guide portion of another battery unit. Thus, the lower and upper surfaces of the inlet guide portions 210 of neighboring battery units 110 form a funnel-shaped space having an increasing cross-section toward the outside. The inclination surface 211 may have the guide pins 212.

In the present invention, the inclination surface 211 and the guide pins 212 may be formed on each of upper and lower surfaces of the case 200. However, the present invention is not limited thereto. For example, the lower surface of the case 200 may be a planar surface and the inclination surface and the guide pins may be formed on only the upper surface of the case 200. Alternatively, the upper surface of the case 200 may be a planar surface and the inclination surface and the guide pins may be formed on only the lower surface of the case 200.

A width $W_1$ of the outlet guide portion 220 may be smaller than a width $W_2$ of the inlet guide portion 210. For example, although the inlet guide portion 210 and the outlet guide portion 220 lie on the same plane, the width $W_1$ of the outlet guide portion 220 may be formed to be smaller than the width $W_2$ of the inlet guide portion 210, thereby, as illustrated with reference to FIGS. 1 and 2, forming the outlet guide portion 220 to have a small cross-sectional area.

Referring to FIG. 5, the outlet guide portion 220 may divide discharged air into two layers by a separation wall 221. The separation wall 221 has a surface with a given width and by the surface, the outlet guide portion 220 may be divided into a first-layer outlet guide portion 220a and a second-layer outlet guide portion 220b. air discharged through the first-layer outlet guide portion 220a directly contacts the electrode terminals 320, and air discharged through the second-layer outlet guide portion 220b form a different layer from the air discharged through the first-layer outlet guide portion 220a.

The separation wall 221 may be disposed to form an angle with respect to the electrode terminals 320. For example, the separation wall 221 may be inclined with respect to the electrode terminals 320. Accordingly, due to the inclination of the separation wall 221, a cross-section size of the first outlet guide portion 220a gradually decreases in a direction in which air is discharged. Thus, the speed of air passing through the first outlet guide portion 220 increases and the cooling efficiency for the electrode terminal 320 may be improved.

Guide pins 222a and 222b may be respectively formed on upper and lower surfaces of the separation wall 221. That is, the guide pins 222a and 222b may be formed on the first-layer outlet guide portion 220a and the second-layer outlet guide portion 220, thereby maintaining a linear flow of discharged air.

In the present embodiment, the guide pins 222a and 222b are respectively formed on the first-layer outlet guide portion 220a and the second-layer outlet guide portion 220b. However, the present invention is not limited thereto. For example, there could be only the guide pin 222a formed on the first-layer outlet guide portion 220a.

Protrusions 240 may be formed on side ends of the first terminal housing portion 203. The protrusions 240 may allow air discharged toward the cathode terminal 320 to maintain its linear flow. For example, the protrusions 240 prevent air discharged in the D1 direction from dispersing laterally, thereby preventing a decrease in cooling efficiency for the cathode terminal 320. Likewise, the protrusions 240 are formed on side ends of the second terminal housing portion 204 so as to improve cooling efficiency for the anode terminal 320.

In the present embodiment, the case 200 includes the first case 201 and the second case 202. However, the present invention is not limited thereto. For example, the case 200 may be divided into four parts that respectively house four corners of the battery cell 300 and the parts may be combined by assembly, cohesion, or thermal fusion.

Figure 7:
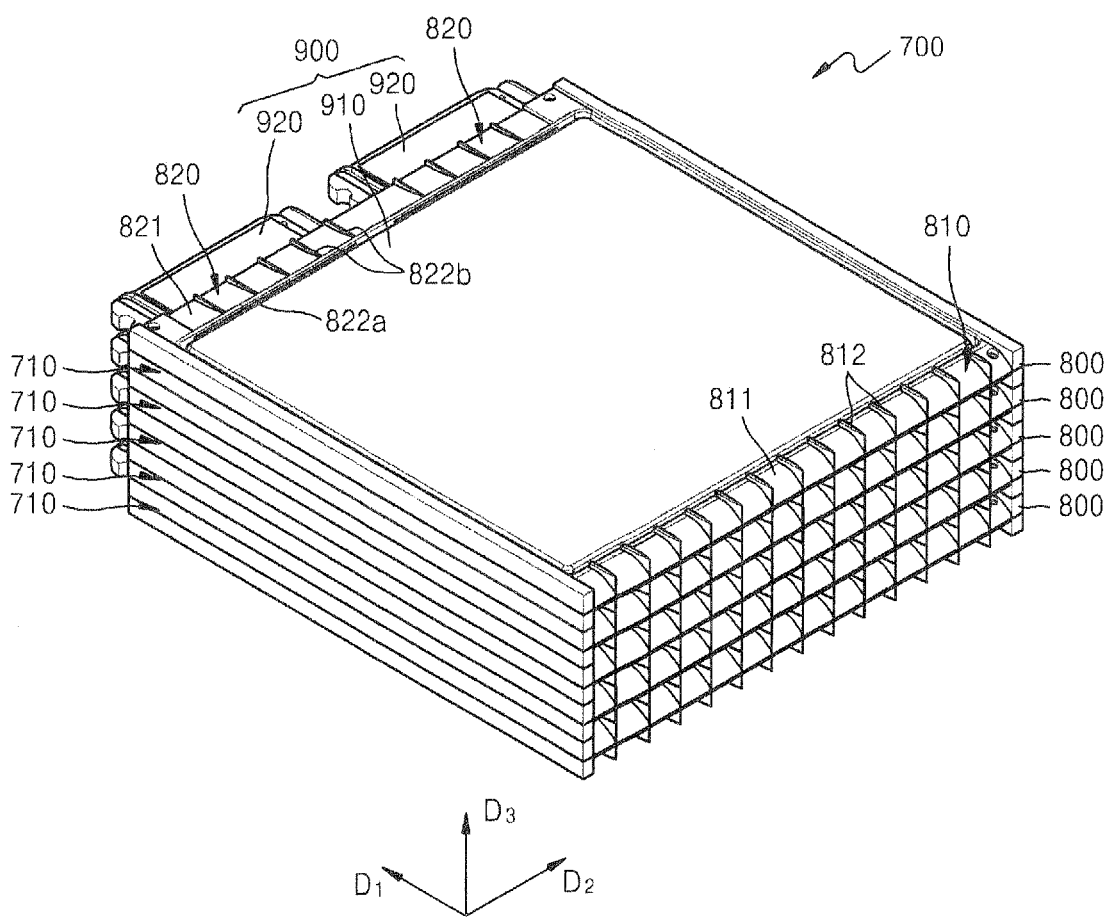
FIG. 7 is a schematic perspective view of a battery module according to another embodiment of the present invention.
Figure 8:
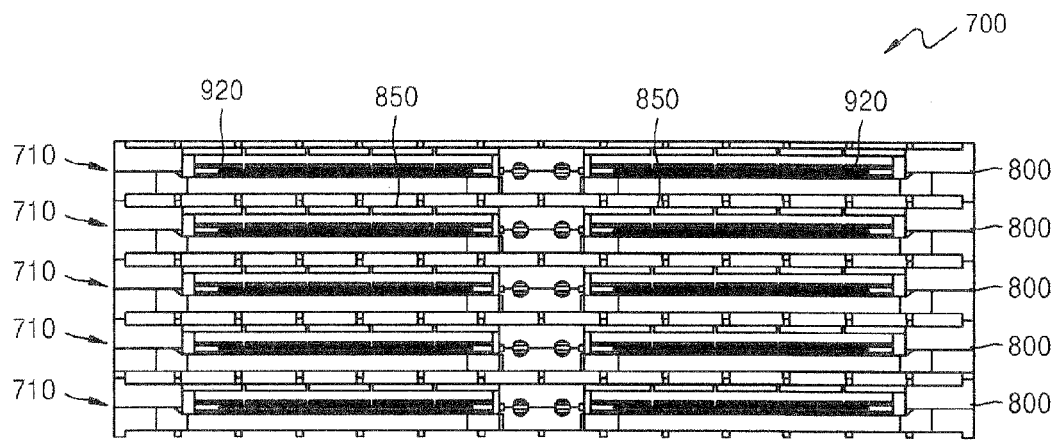
FIG. 8 is a cross-sectional view of the battery module of FIG. 7 showing an outlet guide portion.
Figure 9:
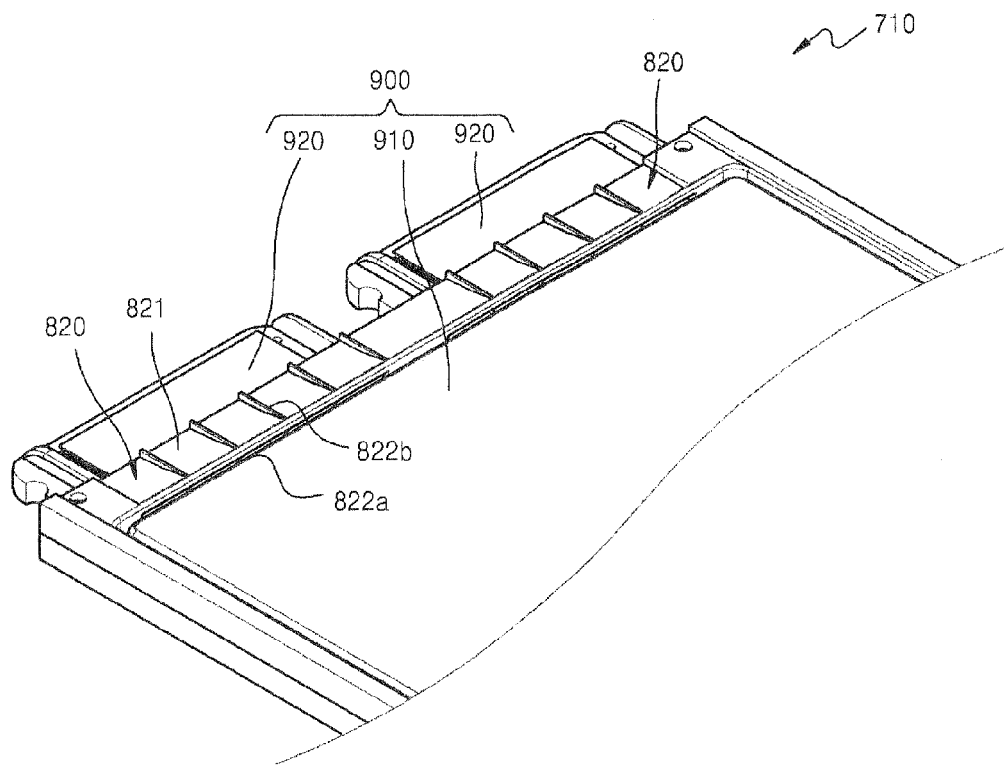
FIG. 9 is a perspective enlarged view of an outlet guide portion of a battery unit that constitutes the battery module of FIG. 7.

FIG. 7 is a schematic perspective view of a battery module 700 according to another embodiment of the present invention, FIG. 8 is a cross-sectional view of the battery module 700 of FIG. 7 showing an outlet guide portion 820, and FIG. 9 is a perspective enlarged view of the outlet guide portion 820.

Referring to FIGS. 7 through 9, the battery module 700 according to the present embodiment includes battery units 710 stacked on each other in the D3 direction, and a cooling channel 850 is formed between neighboring battery units 710. Thus, air flowing through any one cooling channel cools main bodies of neighboring battery units, and air discharged from the cooling channel 850 flows toward electrode terminals 920 to cool the electrode terminals 920.

The battery module 700 may include an inlet guide portion 810 for guiding external air into the battery module 700/the cooling channel 850 and the outlet guide portion 820 for guiding air toward the electrode terminals 920. In this regard, locations, shapes, and structures of the inlet and outlet guide portions 810 and 820 are the same as described in the previous embodiment. For example, the outlet guide portion 820 may be disposed on a side of the battery module 700/the battery unit 710 where the electrode terminals 920 are disposed, and the inlet guide portion 810 disposed on another side is opposite to the outlet guide portion 820.

However, unlike the previous embodiment, according to the present embodiment, all surfaces of the electrode terminals 920 of each of the battery units 710 of the battery module 700 are exposed in the D3 direction. Accordingly, air discharged from one cooling channel cools anode and cathode terminals of one battery unit.

Since the electrode terminals 920 are exposed in the same direction, the outlet guide portions 820 lie on the same plane. Like the previous embodiment, according to the present embodiment, the outlet guide portion 820 is divided into two layers by a separation wall 821, and guide pins 822a and 822b are respectively formed on the layers.

In comparison with the battery module 100 described with reference to FIGS. 1 through 3, the shape of the outlet guide portion 820 is different from that of the battery module 100 since a second terminal housing portion 804 (see FIG. 10) and a first terminal housing portion 803 (see FIG. 10) are exposed in the same direction.

Figure 10:
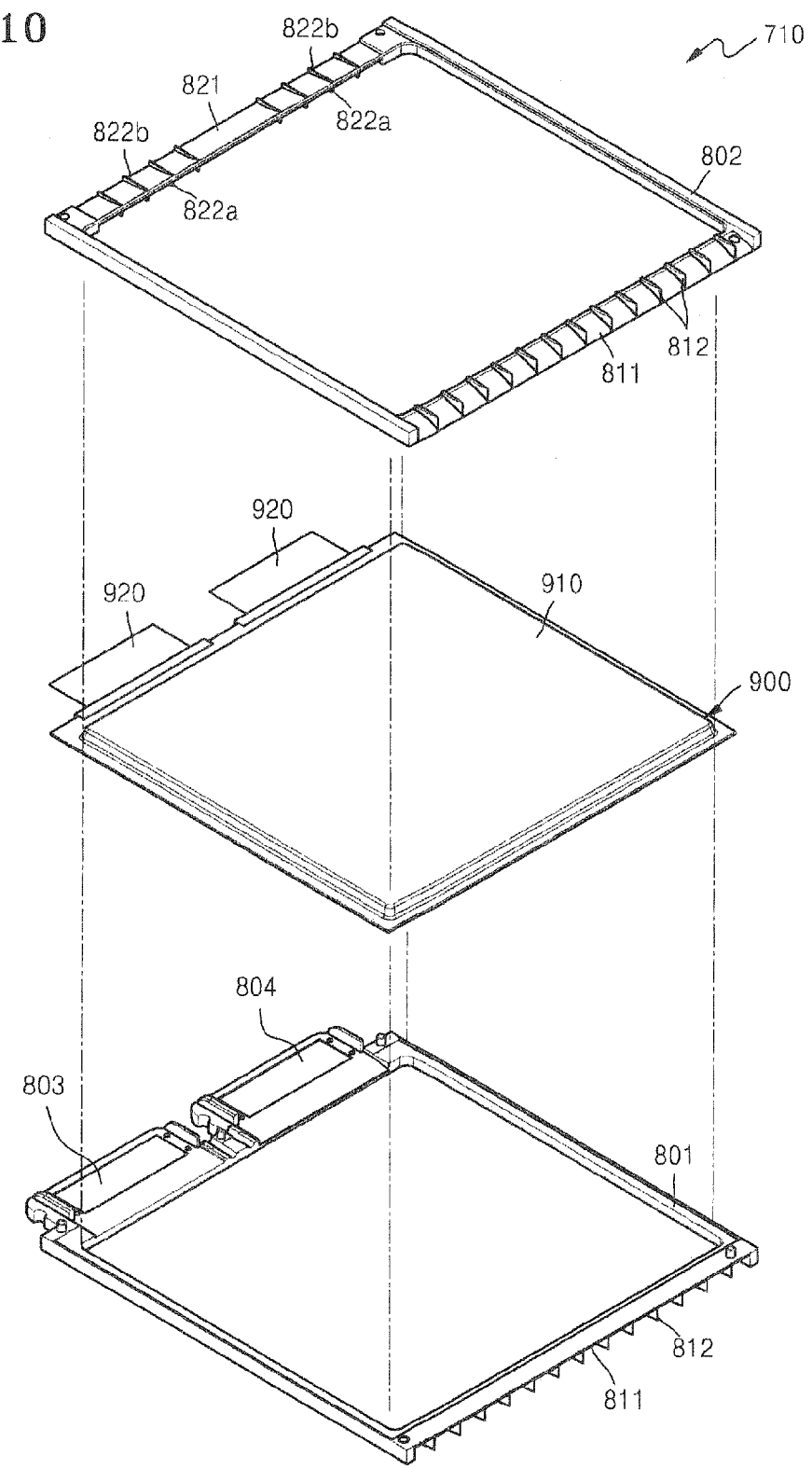
FIG. 10 is an exploded perspective view of the battery unit of FIG. 9.

FIG. 10 is an exploded perspective view of the battery unit 710 of FIG. 9.

Referring to FIG. 10, the battery unit 710 according to the present embodiment may include a case 800 including a battery cell 900 and a case 800 for housing the battery cell 900, and the case 800 includes a first case 801 and a second case 802. Like the previous embodiment, the battery unit 710 according to the present embodiment includes the inlet guide portion 810 ad the outlet guide portion 820, and the inlet guide portion 810 ad the outlet guide portion 820 are identical to those of the battery unit 110 described with reference to FIGS. 4 through 6.

However, in the battery unit 710, the electrode terminals 920 are exposed in the same direction. Thus, the first terminal housing portion 803 and the second terminal housing portion 804 are both formed in the first case 801. In addition, since the case 800 is completely assembled by combining the first case 801 and the second case 802, the separation wall 821 and the guide pins 822a and 822b, which constitute the outlet guide portion 820, are formed in the second case 802.

Figure 11A:
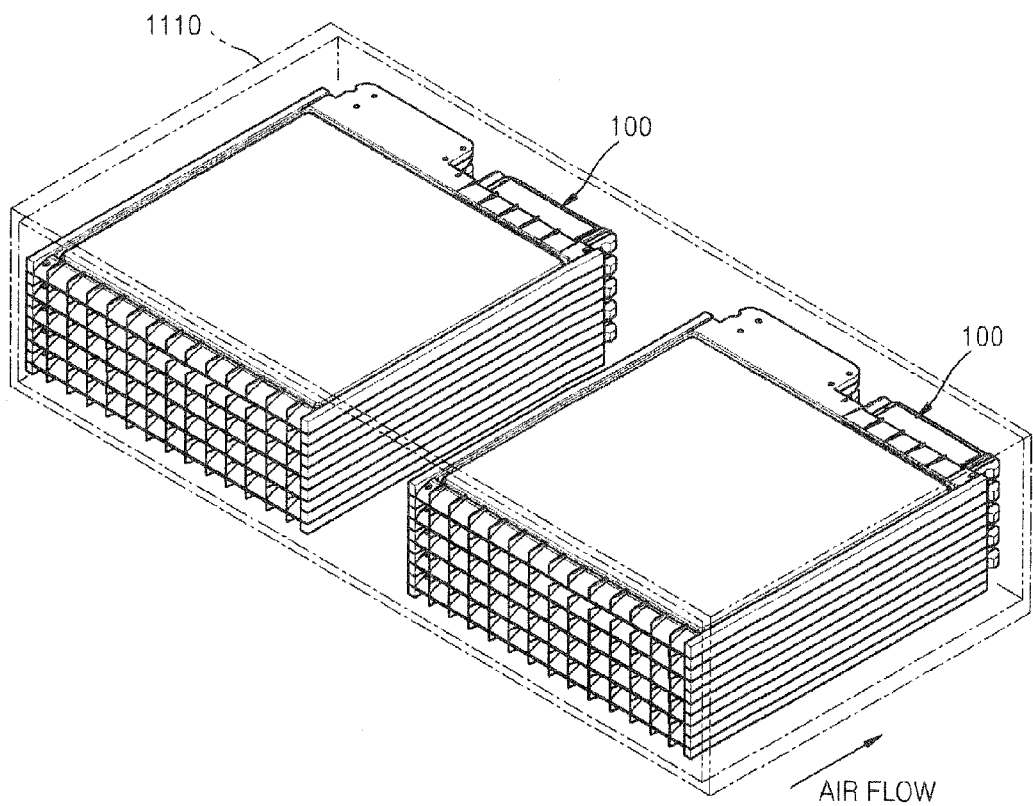
FIGS. 11A and 11B are schematic perspective views of a battery module and a battery unit according to another embodiment of the present invention, respectively.
Figure 11B:
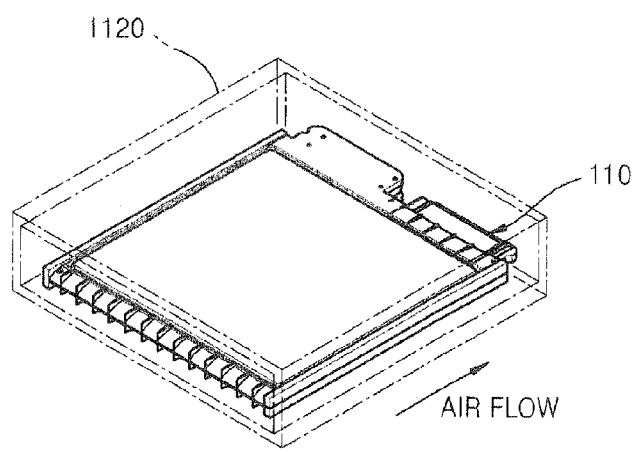

FIGS. 11A and 11B are schematic perspective views of a battery module and a battery unit according to another embodiment of the present invention, respectively.

Referring to FIG. 11A, a plurality of battery modules 100 may be placed in a housing 1110. The housing 1110 has open facing sides for air flow. A cooling fan (not shown) may be provided on a side of the housing 1110. In the housing 1110, the battery modules 100 may be connected in series or parallel to embody a large-scale electricity storage and supply device.

Referring to FIG. 11B, a battery unit 110 is placed in a housing 1120 and this one pack structure may be used. According to another embodiment, a plurality of the battery units 110 placed in the housing 1120 may be stacked to form a battery module.

As described above, in the battery modules 100 and 700, a space between neighboring battery units 110 and 710 corresponds to the cooling channels 250 and 850. Thus, there is no need to use additional components to form cooling channels 250 and 850. Thus, the manufacturing time and costs thereof may be reduced.

Also, the structure of the inlet guide portions 210 and 810 and the outlet guide portions 220 and 820 may attribute to high cooling efficiency.

As described above, according to the one or more of the above embodiments of the present invention, heat generated by a main body and electrode terminals of a battery cell may be efficiently removed. Also, battery units are easily assembled and additional components may not be used for the assembling. Thus, the manufacturing time and costs thereof may be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery unit, comprising:
a battery cell having electrode terminals, said battery cell has two surfaces and four edges, anyone of said four edges are narrower than either of the two surfaces; and
a case for housing the battery cell,
wherein the case comprises:
a spacer that is disposed on facing portions of an edge of the case and protrudes in a thickness direction of the case,
an inlet guide portion for guiding air for cooling the battery cell, said inlet guide portion of the case is located on one of the edges of the battery cell; and
an outlet guide portion disposed solely at one edge of the battery cell and parallel to only one surface of the battery cell, the outlet guide portion, comprises:
a first-layer outlet guide portion for guiding air to be discharged toward the electrode terminals; and
a second-layer outlet guide portion that is disposed above the first-layer outlet guide portion and guides air to be discharged, at least one of the first-layer outlet guide portion and the second-layer outlet guide portion includes the plurality of guide pins extending in a direction in which air is discharged, the first-layer outlet guide portion and the second-layer outlet guide portion are separated from each other by a separation wall dividing discharged air between the first-layer outlet guide portion and the second-layer outlet guide portion, wherein the separation wall is inclined toward the electrode terminals,
wherein the inlet guide portion further comprises:
an inclination surface that is shaped so that a lower and an upper surface of the inlet guide portions of a neighboring battery cell form a funnel-shaped space having an increasing cross-section as a distance from the battery cell increases; and
a plurality of guide pins extending at a 90 degree from the inclination surface and encompassing an entire width of the inclination surface with a tapered end at a point where a cross-sectional area is greatest.

2. The battery unit of claim 1, wherein a width of the outlet guide portion is narrower than a width of the inlet guide portion.

3. The battery unit of claim 1, wherein the plurality of guide pins extending in a direction in which air flows.

4. The battery unit of claim 1, wherein the case exposes at least one surface of upper and lower surfaces of the battery cell.

5. The battery unit of claim 1, wherein a thickness of the case is greater than a thickness of the battery cell.

6. The battery unit of claim 1, wherein the case comprises terminal housing portions for housing the electrode terminals.

7. The battery unit of claim 6, wherein each of the terminal housing portions comprises protrusions on side ends of each terminal housing portion.

8. The battery unit of claim 1, wherein the inlet guide portion is opposite to the outlet guide portion.

9. A battery module, comprising:
a plurality of battery units stacked on each other in a thickness direction; and
a cooling channel formed between neighboring battery units of the battery units to provide a space in which air for cooling the battery units flows,
wherein each of the battery units of the plurality of battery units has two surfaces and four edges, anyone of said four edges are narrower than either of the two surfaces, comprises:
a battery cell comprising electrode terminals, and
a case for housing the battery cell, wherein the case comprises:
- a spacer that is disposed on facing portions of an edge of the case and protrudes in a thickness direction of the battery unit,
- an inlet guide portion for guiding air into the cooling channel, said inlet guide portion of the case is located on one of the edges of each battery unit, and
- an outlet guide portion disposed solely at one edge of the battery unit and parallel to only one surface of the battery unit, the outlet guide portion, comprises:

a first-layer outlet guide portion for guiding air to be discharged toward the electrode terminals; and a second-layer outlet guide portion that is disposed above the first-layer outlet guide portion and guides air to be discharged, at least one of the first-layer outlet guide portion and the second-layer outlet guide portion includes the plurality of guide pins extending in a direction in which air is discharged, the first-layer outlet guide portion and the second-layer outlet guide portion are separated from each other by a separation wall dividing discharged air between the first-layer outlet guide portion and the second-layer outlet guide portion, wherein the separation wall is inclined toward the electrode terminals, wherein the inlet guide portion further comprises:
an inclination surface that is shaped so that a lower and an upper surface of the inlet guide portions of a neighboring battery unit form a funnel-shaped space having an increasing cross-section as a distance from the battery units increases; and
a plurality of guide pins extending at a 90 degree from the inclination surface and encompassing an entire width of the inclination surface with a tapered end at a point where a cross-sectional area is greatest.

10. The battery module of claim 9, wherein the battery units are stacked using the spacer.

11. The battery module of claim 9, wherein a width of the outlet guide portion is narrower than a width of the inlet guide portion.

12. The battery module of claim 9, wherein the separation wall is aligned in a direction perpendicular to the thickness direction.

13. The battery module of claim 9, wherein the case exposes at least one surface of upper and lower surfaces of the battery cell to the cooling channel.

14. The battery module of claim 9, wherein the inlet guide portion is opposite to the outlet guide portion.

* * * * *